United States Patent
Yang et al.

(10) Patent No.: US 12,206,116 B2
(45) Date of Patent: Jan. 21, 2025

(54) CARBON SUPPORT FOR FUEL CELL CATALYST AND METHOD OF MANUFACTURING THE SAME

(71) Applicants: Hyundai Motor Company, Seoul (KR); Kia Motors Corporation, Seoul (KR); Korea Advanced Institute of Science and Technology, Daejeon (KR)

(72) Inventors: Ji Hoon Yang, Gyeonggi-do (KR); Jin Seong Choi, Gyeonggi-do (KR); Kook Il Han, Gyeonggi-do (KR); Geon Hee Cho, Uijeongbu-si (KR); Jin Woo Lee, Daejeon (KR); Ah Ryeon Lee, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 54 days.

(21) Appl. No.: 17/217,987

(22) Filed: Mar. 30, 2021

(65) Prior Publication Data

US 2022/0181644 A1    Jun. 9, 2022

(30) Foreign Application Priority Data

Dec. 9, 2020    (KR) .................. 10-2020-0171545

(51) Int. Cl.
  *H01M 4/92* (2006.01)
  *H01M 4/90* (2006.01)
(52) U.S. Cl.
  CPC ......... *H01M 4/926* (2013.01); *H01M 4/9083* (2013.01)

(58) Field of Classification Search
  CPC .................. H01M 4/9083; H01M 4/926
  See application file for complete search history.

(56) References Cited

U.S. PATENT DOCUMENTS

2013/0288155 A1* 10/2013 Kim .................. C04B 35/524
                                                      427/113
2017/0005342 A1*  1/2017 Kim .................. H01M 4/8817
                        (Continued)

FOREIGN PATENT DOCUMENTS

CN     107634230 A  *  1/2018
CN     108630953 A  * 10/2018 .......... H01M 4/9083
                        (Continued)

OTHER PUBLICATIONS

Machine translation of Wang et al.(CN111725524 A), publication date Sep. 29, 2020.*

(Continued)

*Primary Examiner* — Jun Li
(74) *Attorney, Agent, or Firm* — Fox Rothschild LLP

(57) ABSTRACT

Disclosed are a method of manufacturing a carbon support for a fuel cell catalyst, a carbon support for a fuel cell catalyst manufactured according to the method, and a catalyst for a fuel cell including the same. The method may include using various organic materials containing N and various carbon supports and thus provide excellent economic feasibility. In addition, pyridinic N and pyrrolic N of doped N can be adjusted at an optimal content ratio so that the carbon support for a fuel cell catalyst manufactured and the catalyst for a fuel cell including the same have excellent electrochemical resistance and excellent electrochemical characteristic due to an increase in an electrochemically active surface area, and excellent durability due to an increase in thermal durability.

10 Claims, 8 Drawing Sheets

(56) References Cited

U.S. PATENT DOCUMENTS

| | | | |
|---|---|---|---|
| 2017/0342578 A1* | 11/2017 | Tour | H01M 4/921 |
| 2018/0166694 A1* | 6/2018 | Chang | H01M 4/8882 |
| 2018/0248200 A1* | 8/2018 | Arihara | H01M 4/92 |
| 2020/0316567 A1* | 10/2020 | Kim | B01J 23/6522 |

FOREIGN PATENT DOCUMENTS

| | | | | |
|---|---|---|---|---|
| CN | 111725524 A | * | 9/2020 | H01M 4/88 |
| KR | 101629083 B1 | | 6/2016 | |
| KR | 101679809 B1 | | 11/2016 | |
| KR | 2017-0004248 A | | 1/2017 | |
| KR | 2020-0117527 A | | 10/2020 | |

OTHER PUBLICATIONS

Machine translation of Lei et al.(CN107634230A), publication date Jan. 26, 2018.*
Machine translation of Wu et al.(CN108630953A), publication date Oct. 9, 2018.*

* cited by examiner

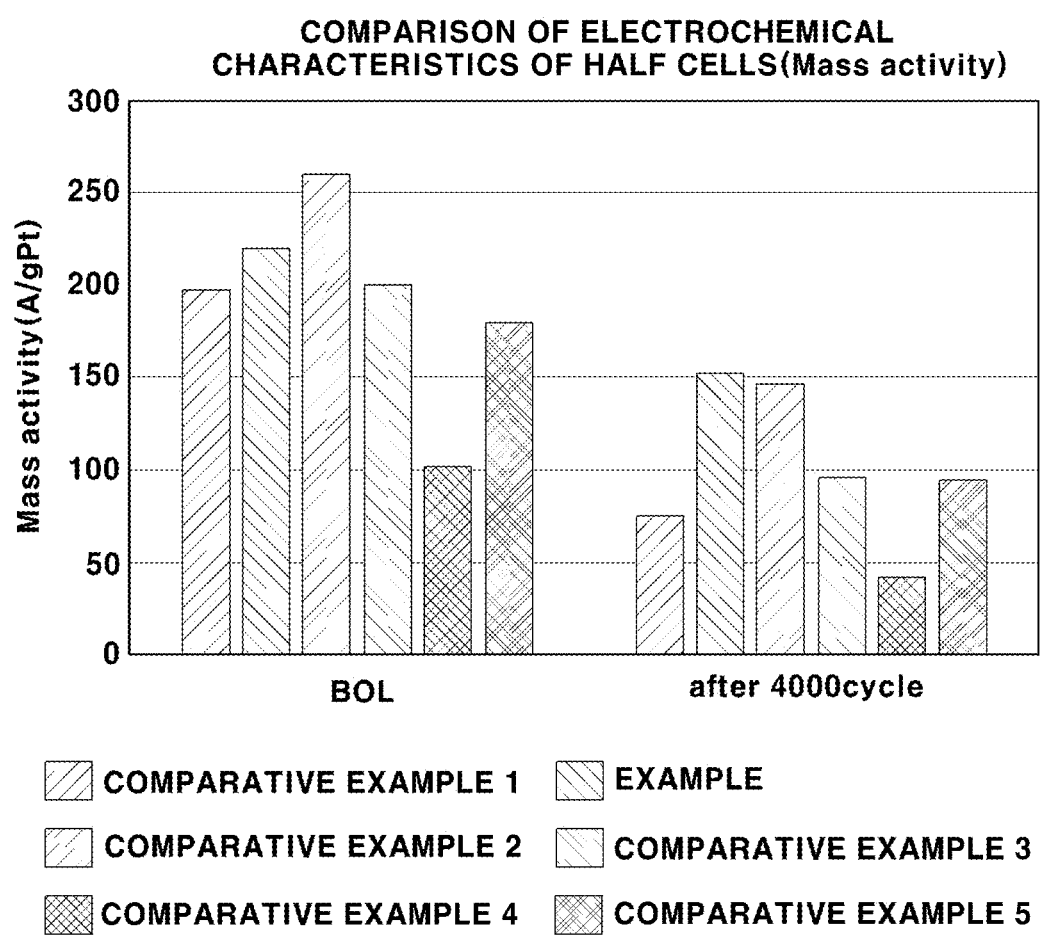

CARBON SUPPORT FOR FUEL CELL CATALYST AND METHOD OF MANUFACTURING THE SAME

CROSS-REFERENCE TO RELATED APPLICATION

This application claims under 35 U.S.C. § 119(a) the benefit of priority to Korean Patent Application No. 10-2020-0171545 filed on Dec. 9, 2020, the entire contents of which are incorporated herein by reference.

TECHNICAL FIELD

The present invention relates to a method of manufacturing a carbon support for a fuel cell catalyst, a carbon support for a fuel cell catalyst manufactured according to the method, and a catalyst for a fuel cell including the same.

BACKGROUND

Carbon materials are easily synthesized in mass and have excellent electrical conductivity, and due to high specific surface areas and acid/base stability, examples in which the carbon materials are applied to electrochemical devices have been increased. Recently, various carbon materials have been used as catalyst supports for electrochemical reactions of positive/negative electrodes even in fuel cell devices receiving much attention as new renewable energy sources, but carbon black supports have been used almost exclusively as the catalyst supports.

For commercialization of fuel cells, a lot of attention has been drawn in order to improve initial performance of fuel cells and securing long-term performance.

Platinum (Pt) has exhibited the most efficient catalytic activity among catalyst materials in an electrochemical reaction for driving a fuel cell, but because of high cost, the recent development of Pt material recovery methods has progressed so that many problems in the use of the Pt catalyst have been solved.

However, during a long-term operation, performance of a fuel cell through an electrochemical reaction, particularly, in the case of a fuel cell for a vehicle, has been deteriorated due to a stability problem in which electrochemical oxidation/corrosion of a carbon support, which causes thinning of a catalyst layer and agglomeration of a catalyst are caused. This has emerged as one of main causes of degradation in securing long-term performance of the fuel cell.

In order to solve the above problem, development of a support having high stability and corrosion resistance under an electrochemical atmosphere has been sought so as to maintain high efficiency and stable catalytic reaction in operating conditions of various fuel cells.

Recently, the focus has been on material synthesis to make carbon materials more resistant to a corrosion or oxidation reaction. For example, graphitized carbon (e.g., a carbon nanotube (CNT), graphene, or the like) exhibits a relatively slow degree of degradation in electrochemical corrosion when compared with carbon black, but the graphitized carbon does not exhibit perfect durability, and a material exhibiting perfect durability has not yet been found.

In other example, various studies have been carried out to develop a catalyst support using a non-carbon material instead of a carbon material. Recently, oxide/nitride/carbide carriers have been proposed as candidate materials getting attention. However, due to low electrical conductivity of these compounds and low physicochemical characteristics thereof with a catalyst, there is a problem in difficulty to induce high catalytic activity.

A carbon material has been used exclusively as a support for a fuel cell catalyst, and an interior of a device may be exposed to a variation in a variety of voltages, water, or various gaseous atmospheres in various operating conditions (e.g., dynamic load cycling, fuel starvation, freeze/thaw, and start-up/shut-down). In particular, Pt/C used as an electrode catalyst causes an electrochemical corrosion or oxidation phenomenon due to exposure to water or oxygen in a high voltage condition. This phenomenon is known to be a major factor causing serious degradation in performance of the fuel cell.

In the related art, in order to solve the problem of degradation in catalyst, studies have been continuously carried out to improve elution and agglomeration of a Pt catalyst by coating a separate layer on a carbon surface or doping with nitrogen elements. However, the studies not only are complicated in a solving process, but also disclose only an effect on the presence or absence of nitrogen doping, and studies on a technology are not sufficient to maximize an effect of improving an electrochemical characteristic and durability by controlling factors for enhancing the electrochemical characteristic and the durability.

SUMMARY

The present invention has been made in an effort to solve the above-described problems associated with prior art, and detailed objectives are as follows.

In one preferred aspect, the present invention provides a method of manufacturing a carbon support for a fuel cell catalyst, which is capable of including a content ratio of nitrogen in pyridine (pyridinic N) and the nitrogen content in pyrrole (pyrrolic N) presented in the carbon support.

In another preferred aspect, the present invention provides a carbon support for a fuel cell catalyst with improved electrochemical characteristic and durability due to pyridine and/or pyrrole included preferably at an optimal content ratio by the above manufacturing method, and a catalyst for a fuel cell containing a catalyst metal supported on the carbon support.

Objectives of the present invention are not limited to the above-described objectives, and other objectives of the present invention, which are not mentioned, can be understood by the following description and also will be apparently understood through embodiments of the present invention. Further, the objectives of the present invention can be implemented by means described in the appended claims and a combination thereof.

In one aspect, a method of manufacturing of a carbon support for a fuel cell catalyst is provided, the method comprising heat treating a conductive carbon support and one or more organic materials that comprise nitrogen (N).

In a further aspect, provided is a method of manufacturing a carbon support for a fuel cell catalyst, which may include preparing an admixture including a conductive carbon support and an organic material containing nitrogen (N), and heat-treating the admixture. In particular, the carbon support may include pyridine or pyrrole.

The method may further include, before the preparing the admixture, pretreating the conductive carbon support with an acid solution.

In the pretreating, a weight ratio of the conductive carbon support to the acid solution may be about 1:40 to 50.

In the pretreating, the pretreatment may be performed at a temperature ranging from about 130° C. to about 150° C. for one to two hours.

The conductive carbon support may include one or more selected from the group consisting of carbon black, acetylene black, carbon nanotubes, black lead, graphene, graphite nanofibers, fullerene, ketjen black, graphite, and ordered mesoporous carbon.

An acid contained in the acid solution may include one or more selected from the group consisting of nitric acid, hydrochloric acid, sulfuric acid, and perchloric acid.

In the preparing the admixture, a weight ratio of the pretreated conductive carbon support to the organic material containing N may be about 1:5 to 10.

The organic material containing N may include one or more selected from the group consisting of melamine, urea, ammonia ($NH_3$), and cyanide (CN).

The heat treatment may be performed at a variety of temperatures including in excess of about 200° C., 300° C., 400° C., 500° C., 600° C. or 700° C. and in particular aspects the heat treatment may range in temperature from about 750° C. to about 850° C.

The method may further include, after the heat-treating of the admixture, washing and drying the heat-treated admixture.

The washing may be performed with a mixed solution of water and ethanol at a temperature ranging from about 50° C. to about 70° C.

The drying may be performed at a temperature ranging from about 80° C. to about 85° C. for ten to fourteen hours.

In an aspect, provided is a carbon support for a fuel cell catalyst that is manufactured according to the method described above. In particular, an interior of the carbon support may be doped with nitrogen, which may be present in a form of pyridine and/or pyrrole.

If pyridine and pyrrole compounds are both present, a ratio of the pyridinic N/the pyrrolic N may suitably range widely and in particular aspects suitably may be from about 0.50 to about 1.30.

Further provided is a catalyst for a fuel cell may be supported on the carbon support for a fuel cell catalyst.

The catalyst metal may include one or more selected from the group consisting of platinum (Pt), gold, silver, iridium, palladium, rhodium, a Pt-nickel alloy, and a Pt-cobalt alloy.

Other aspect of the invention are disclosed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 5A and 5B are graphs comparing electrochemical characteristics before and after analysis of electrochemical characteristics of half cells of the catalysts for a fuel cell (FIG. 5A) and corresponding degradation rates (FIG. 5B) according to Example and Comparative Examples 1 to 5.

Figure 1:
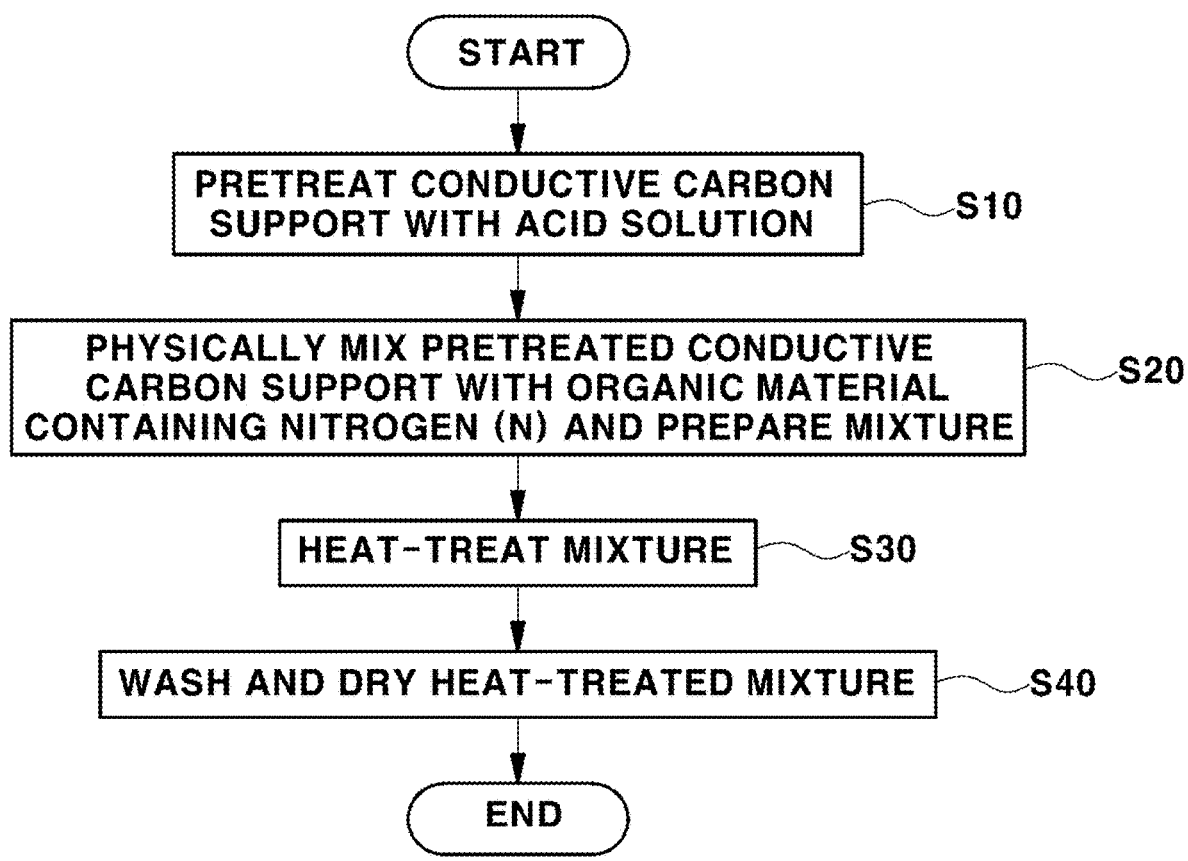
FIG. 1 shows an exemplary method of manufacturing an exemplary carbon support for a fuel cell catalyst according to an exemplary embodiment of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above and other objectives, features, and advantages of the present invention will become more apparent from the following description of preferred embodiments with reference to the accompanying drawings. However, the present invention is not limited to the embodiments disclosed herein and may be implemented in other forms. The embodiments disclosed herein will be provided to make this invention thorough and complete, and will fully convey the spirit of the present invention to those skilled in the art.

In the present specification, it should be understood that the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about."

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

In the present specification, when a range is described for a variable, it will be understood that the variable includes all values within the range including endpoints described in the range. For example, it will be understood that a range from "5 to 10" includes values of 5, 6, 7, 8, 9, and 10 as well as any subranges such as ranges from 6 to 10, from 7 to 10, from 6 to 9, from 7 to 9, and the like, and also includes any values between integers, which are reasonable in the scope of ranges, such as 5.5, 6.5, 7.5, 5.5 to 8.5, and 6.5 to 9, and the like. In addition, for example, it will be understood that a range from "10% to 30%" includes all integers including values of 10%, 11%, 12%, 13%, and the like and up to 30% as well as any subranges such as ranges from 10% to 15%, from 12% to 18%, from 20% to 30%, and the like, and also includes any values between integers, which are reasonable in the scope of ranges, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

In the related art, nitrogen (N) doped on a carbon support had a high ratio of graphitic N. Since the graphitic N has insufficient interaction with a catalyst metal, there is a problem in that it is difficult to be regarded as a factor capable of improving an electrochemical characteristic and durability of a catalyst for a fuel cell with an N content alone. Thus, in order to complement durability, a separate coating layer or a separate polymer layer is formed on a carbon support to manufacture a carbon support.

Thus, provided herein is a manufacturing method capable of forming new pyridinic N and pyrrolic N by directly doping N inside carbon bonding in a conductive carbon support even with only simplified physical synthesis and a primary heat treatment process and capable of improving an electrochemical characteristic and durability by adjusting a content ratio of pyridinic N atoms and pyrrolic N so that the present invention was completed.

FIG. 1 is a schematic flowchart illustrating a method of manufacturing a carbon support for a fuel cell catalyst according to an exemplary embodiment of the present invention. As shown in FIG. 1, the manufacturing method includes pretreating a conductive carbon support with an acid solution (S10); preparing an admixture including the pretreated conductive carbon support and an organic material containing N, for example, by physically mixing these components (S20); heat-treating the admixture (S30); and washing and drying the heat-treated admixture (S40).

In particular, the N doped on a final carbon support by the manufacturing method may include nitrogen as being present in a form of pyridine and pyrrole, i.e., the pyridinic N and the pyrrolic N.

The term "pyridinic N" used herein means a doped N with a structure of the N doped in the carbon support for a fuel cell catalyst manufactured by the manufacturing method, in which one carbon of benzene rings, such as N in pyridine, is substituted with N.

In addition, the term "pyrrolic N" used herein means a doped N with a structure of the N doped in the carbon support for a fuel cell catalyst manufactured by the manufacturing method, in which a pentagonal carbon ring of which one N, such as N in pyrrole, is substituted with N to constitute an aromatic ring in an asymmetric ring structure.

The pretreating (S10) is a step of pretreating the conductive carbon support with an acid solution to impart a functionalizing effect to a surface of the carbon support. When N doping is performed on the functionalized carbon surface, formation of pyridinic N or pyrrolic N instead of graphitic N preferably occurs.

Preferably, the pretreating may be performed at a temperature ranging from about 130° C. to about 150° C. for one to two hours in a weight ratio of the conductive carbon support to the acid solution of about 1:40 to 50. When the weight ratio is less than about 1:40, a pretreatment time may be less than about one hour, or a pretreatment temperature may be less than about 130° C., a degree of functionalizing of the carbon surface may be lowered so that a pretreatment effect may not occur. When the weight ratio is greater than about 1:50, the pretreatment time may be greater than about two hours, or the pretreatment temperature may be greater than about 150° C., a defect may occur in the conductive carbon support so that there may be a disadvantage in that durability of the conductive carbon support may be degraded.

The conductive carbon support is a general conductive carbon support, which may be used in the present invention, for example, one or more selected from the group consisting of carbon black, acetylene black, carbon nanotubes, black lead, graphene, graphite nanofibers, fullerene, ketjen black, graphite, and ordered mesoporous carbon, and is not limited to including a specific type.

The acid included in the acid solution for treating the conductive carbon support may include one or more selected from the group consisting of nitric acid, hydrochloric acid, sulfuric acid, and perchloric acid, and is not limited to including a specific acid, but preferably, the acid may be nitric acid with strong acidity.

Particularly, when the conductive carbon support is pretreated with an acid solution according to an exemplary embodiment of the present invention, an effect of functionalizing of the carbon surface may be provided, and thus it is preferable to form pyridinic N and pyrrolic N instead of graphitic N during the N doping so that electrochemical resistance and an electrochemical characteristic due to an increase in an electrochemically active surface area of the carbon support for a fuel cell catalyst to be manufactured may be improved and durability due to an increase in thermal durability may be improved.

The preparing of the admixture (S20) is a step of preparing the admixture including conductive carbon support (S10) with an organic material containing N, for example, by physically mixing the pretreated conductive carbon support (S10) with an organic material containing N.

For example, the method of physically mixing the pretreated conductive carbon support with the organic material containing N may be any physical mixing method which may be used in the present invention, for example, one or more methods selected from among a mixing method using a mortar, a mixing method using a stirrer, and a mixing method using beads, but is not limited to a specific method.

Thus, the weight ratio of the pretreated conductive carbon support to the organic material containing N may be mixed at a ratio of about 1:5 to 10 through the physical mixing method. When the weight ratio is less than about 1:5, N in the organic material containing N may not be properly doped into the conductive carbon support. When the weight ratio is greater than about 1:10, defects may occur due to a probability of excessive doping of the N in the organic material containing N into the conductive carbon support so that stability and electrical conductivity of a carbon support for a fuel cell catalyst to be manufactured may be degraded, and a risk of gas leakage or the like may be increased in a subsequent heat treatment operation.

The organic material containing N may include a material which allows the conductive carbon support to be appropriately doped with pyridinic N and pyrrolic N, for example, one or more materials selected from the group consisting of melamine, urea, ammonia ($NH_3$), and cyanide (CN), and is not limited to including a specific component. Preferably, the organic material containing N may include melamine which is less toxic and is easy to use in the form of a solid powder.

Particularly, according to the method of manufacturing a carbon support for a fuel cell catalyst according to an exemplary embodiment of the present invention, since the organic material containing N may be simply physically mixed with the pretreated conductive carbon support, it is possible to solve a dispersion problem due to a difference in solubility. In the related art, the conductive carbon support and the organic material containing N are dissolved, respectively, and then mixed, and thus, there is an advantage in that it is possible to use various organic materials containing N and carbon supports which are free from the above dispersion problem.

The heat-treating of the admixture (S30) is a step of heat-treating the admixture prepared by physically mixing the conductive carbon support with the organic material containing N in S20.

Particularly, the heat treatment may be performed on the admixture prepared in S20 at a temperature ranging from at least about 650° C. to about 850° C. for about 0.5 to about 1.5 hours in a condition of an inert gas, and preferably, at a temperature ranging from about 750° C. to about 850° C.

The inert gas is not particularly limited as long as it is an inert gas which can be used in the present invention. For example, the inert gas may be argon (Ar), nitrogen ($N_2$), or the like.

When the heat treatment time is less than about 0.5 hours, thermal decomposition of the organic material containing N may not sufficiently occur, and when the heat treatment time is greater than about 1.5 hours, a process time may be increased due to unnecessary heat treatment being performed. When the heat treatment temperature is too low, it may be difficult for the N in the organic material containing N to be doped into the conductive carbon support, and a content of the pyrrolic N in the manufactured carbon support for a fuel cell catalyst may be decreased so that there is a disadvantage in that an electrochemical characteristic and durability of the carbon support for a fuel cell catalyst may be degraded. In addition, when the heat treatment temperature is too high, it is difficult for the N in the organic material containing N to be doped into the conductive carbon support.

According to the method of manufacturing a carbon support for a fuel cell catalyst according to an exemplary embodiment of the present invention, the organic material containing N may be simply physically mixed with the pretreated conductive carbon support, and the pyridinic N and the pyrrolic N of the N doped according to a specific heat treatment condition, in particular, a heat treatment temperature may be included at an optimal content ratio. Thus, the carbon support for a fuel cell catalyst manufactured according to the above manufacturing method and the catalyst for a fuel cell including the same have advantages of excellent electrochemical resistance and excellent electrochemical characteristic due to an increase in an electrochemically active surface area, and excellent durability due to an increase in thermal durability.

The washing and drying of the heat-treated admixture (S40) is a step of washing and drying the carbon support for a fuel cell catalyst obtained by heat-treating the admixture in which the conductive carbon support is physically mixed with the organic material containing N in the above condition through S30.

Particularly, in order to wash away the organic material containing N, which does not completely react, on the carbon support for a fuel cell catalyst after the heat treatment, the carbon support for a fuel cell catalyst may be washed using a mixed solution in which distilled water having high solubility with respect to the organic material containing N and ethanol having high solubility with respect to the conductive carbon support are mixed. In this case, in order to increase the solubility with respect to the organic material containing N, a temperature of the mixed solution may be raised through water bathing or the like.

Then, in order to remove the mixed solution remaining on the carbon support for a fuel cell catalyst, the carbon support for a fuel cell catalyst may be dried at a temperature ranging from about 80° C. to about 85° C. for ten to fourteen hours.

Consequently, it is characterized in that the carbon support for a fuel cell catalyst according to an exemplary embodiment of the present invention is manufactured according to the manufacturing method so that N may be doped into the carbon support, and the N may be present in a form of the pyridinic N and the pyrrolic N.

Particularly, the organic material containing N may be simply physically mixed with the pretreated conductive carbon support, and the pyridinic N and/or the pyrrolic N of the N doped according to a specific heat treatment condition, in particular, a heat treatment temperature may be adjusted at an optimal content ratio. In aspects where both pyridinic N and pyrrolic N are present, it is preferable to adjust the weight ratio and the heat treatment condition so as to allow a ratio of the pyridinic N/the pyrrolic N to satisfy a range ranging from about 0.50 to about 1.30. When the ratio of the pyridinic N/the pyrrolic N is less than about 0.50, since unshared electron pairs provided from the pyridinic N are small, ability to inhibit elution of a Pt catalyst may be degraded. When the ratio of the pyridinic N/the pyrrolic N is greater than about 1.05, since the number of three-dimensional pentagonal structures provided by the pyrrolic N is small, physical ability to inhibit the elution of the Pt catalyst through the three-dimensional pentagonal structures may be degraded.

In addition, in the catalyst for a fuel cell according to an exemplary embodiment of the present invention, a catalyst metal may be supported on the carbon support for a fuel cell catalyst. In this case, the catalyst metal may include one or more selected from the group consisting of Pt, gold, silver, iridium, palladium, rhodium, a Pt-nickel alloy, and a Pt-cobalt alloy and is not limited to including only a specific component.

Particularly, in accordance with the method of manufacturing a carbon support for a fuel cell catalyst according to one embodiment of the present invention, since the carbon support and the organic material containing N are simply physically mixed, the dispersion problem of solubility, which may become a problem when each of the carbon support and the organic material containing N is dissolved in the distilled water or the organic solvent for mixing, may be solved. Further, it is possible to use various organic materials containing N and various carbon supports, which are free from the above dispersion problem. Since the admixture is subjected to a heat treatment process only once, the process may be simple, and thus there is an advantage of excellent economic feasibility. In addition, the pyridinic N and the pyrrolic N of the doped N may be adjusted at an optimal content ratio through the manufacturing method so that the carbon support for a fuel cell catalyst manufactured according to the above manufacturing method and the catalyst for a fuel cell including the same have advantages of excellent electrochemical resistance and excellent electrochemical characteristic due to an increase in an electrochemically active surface area, and excellent durability due to an increase in thermal durability.

EXAMPLE

Hereinafter, the present invention will be described more specifically by way of examples. The following examples are merely illustrative to aid understanding of the present invention, and the scope of the present invention is not limited by the following examples.

Manufacturing Example: Manufacturing of Carbon Support for Fuel Cell Catalyst

In S10, After 2 g of Vulcan-XC72, which was a conductive carbon support, and 150 ml of nitric acid (60%) were uniformly mixed (at a weight ratio of the conductive carbon support:the acid solution=1:45), acid treatment was performed at a temperature of 140° C. for one hour and then the conductive carbon support was washed with distilled water.

In S20, 2 g of the Vulcan-XC72 which was the pretreated conductive carbon support, and 10 g of melamine which was the organic material containing N (at a weight ratio of the pretreated conductive carbon support:the organic material containing N=1:5) were ground using a mortar to be a uniform powder so that a admixture was prepared.

In S30, before heat treatment is performed, the admixture was purged with argon at a temperature of 30° C. for thirty minutes. Then, the admixture which was purged at a temperature rise rate of 5° C./min was heat treated. When the temperature reached 200° C. during the heat treatment, a rise of a gas pressure was prevented by lowering a flow rate of the argon. The heat treatment was performed until the temperature reached a range of 750° C. to 800° C. to manufacture the carbon support for a fuel cell catalyst. After the heat treatment was completed, the flow rate of the argon was increased to prevent a back flow of a furnace.

In S40, the manufactured carbon support for a fuel cell catalyst was washed with a mixed solution of water and ethanol which were bathed at a temperature of 60° C. (3 l/about 1 g (1 batch)). Then, the carbon support for a fuel cell catalyst was dried in an oven at a temperature of 85° C. for twelve hours.

Comparative Manufacturing Example 1: Conductive Carbon Support

Comparative Manufacturing Example 1 used a simple conductive carbon support which was not manufactured by the manufacturing method according to the present invention.

Comparative Manufacturing Examples 2 to 5: Manufacturing of Carbon Support for Fuel Cell Catalyst When compared with Manufacturing Example, carbon supports for a fuel cell catalyst were manufactured in the same manner as in Manufacturing Example, except that the pretreatment was not performed with the acid solution (Comparative Manufacturing Example 2), the heat treatment was performed at a temperature of 700° C. without the pretreatment with the acid solution (Comparative Manufacturing Example 3), the heat treatment was performed at a temperature of 900° C. without the pretreatment with the acid solution (Comparative Manufacturing Example 4), and the heat treatment was performed at a temperature of 900° C. (Comparative Manufacturing Example 5).

Example: Manufacturing of Catalyst for Fuel Cell

A first solution was prepared by dissolving 0.4 g of $H_2PtCl_6 \cdot 6H_2O$, which is a precursor of the catalyst metal, in 20 ml of ethylene glycol. Meanwhile, a second solution was prepared by dissolving 0.4 g of sodium hydroxide (NaOH) in 20 ml of ethylene glycol.

Then, the first solution and the second solution were stirred and mixed to prepare a third solution. Then, after the third solution was purged with argon, heat treatment was performed on the third solution at a temperature of 160° C. for three hours (a temperature rise rate: 4° C./min).

Then, 10 ml of the heat-treated third solution was added to a conical tube, and then washing was repeatedly performed using 1M HCl through a centrifuge. Thus, precipitated Pt nanoparticles were dispersed in 1 ml of acetone.

Then, a mixed solution, in which 54 mg of the carbon support for a fuel cell catalyst prepared in Manufacturing Example and 3 ml of acetone were mixed, was subjected to ultrasonic treatment for one hour.

Then, the mixed solution was dried in a vacuum oven at a temperature of 60° C. for twelve hours and then heat-treated at a temperature of 200° C. for two hours in a condition of a hydrogen/argon atmosphere of 20% and at a temperature of 200° C. for two hours in a condition of an argon atmosphere (a temperature rise rate: 1° C./min).

Then, after the temperature was dropped to 30° C., the catalyst for a fuel cell was manufactured by being maintained for three to six hours in an oxygen/argon atmosphere of 2%.

Comparative Example 1 to 5: Manufacturing of Catalyst for Fuel Cell

When compared with Example, catalysts for a fuel cell were manufactured in the same manner as in Example, except for using the carbon supports for a fuel cell catalyst manufactured according to Comparative Manufacturing Examples 1 to 5 (Comparative Examples 1 to 5) instead of the carbon support for a fuel cell catalyst manufactured in Manufacturing Example.

Method of Analyzing Electrochemical Characteristic of Half Cell 5 mg of each of the catalysts for a fuel cell according to Example and Comparative Examples 1 to 5 was mixed with 1.25 ml of a solvent (isopropyl alcohol:$H_2O$=4:1) and 20 µl of Nafion solution (5 wt %) and then dispersed by performing sonic treatment for thirty minutes.

The dispersed solution was applied onto polished glassy carbon (having a diameter of 5 mm) with 5 μl, rotated (900 rpm), and dried at room temperature to manufacture an electrode.

The electrode was connected to a rotating disk electrode and then electrochemical measurement was performed in a 0.1M $HClO_4$ solution saturated with oxygen. In this case, a graphite rod was used as a counter electrode, and Ag/AgCl and 3M NaCl were used as a reference electrode.

- 50 mV/s activation 20 cycles from 0.05 V to 1.2 V based on a reversible hydrogen electrode (RHE) (at an inert gas atmosphere).
- the last cycle of the activation process was used as a cyclic voltammetry (CV) (at the inert gas atmosphere).
- scanning from 0.05 V to 1.2 V at 20 mV/s using a linear sweep voltammetry (a rotation speed of the electrode: 1600 rpm).
- an accelerated stress test (AST) of a half cell was performed at a potential cycling ranging from 0.6 $V_{RHE}$ to 1.0 $V_{RHE}$ and 4,000 cycles in 0.1M $HClO_4$ solution purged with oxygen.

Experimental Example 1: Analysis of Catalyst Metal in Catalyst for Fuel Cell Before and After Electrochemical Characteristic Analysis of Half Cell In order to analyze a size and a shape of the catalyst metal in the catalyst for a fuel cell before and after the analysis of the electrochemical characteristics according to the half cell, the catalysts for a fuel cell were manufactured according to Example and Comparative Example 1, and analysis results of transmission electron microscopy (TEM) images thereof were shown in FIGS. 2A to 3B.

Figure 2A:
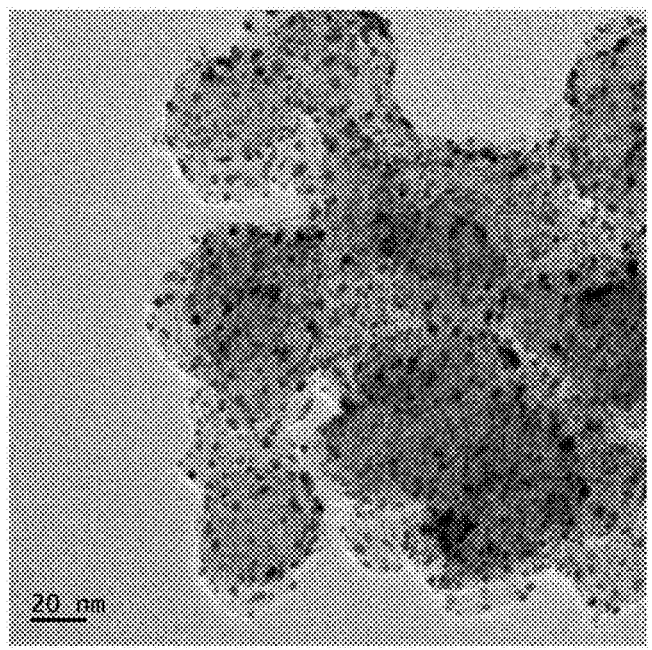
FIGS. 2A and 2B are transmission electron microscopy (TEM) images showing an exemplary catalyst for a fuel cell before electrochemical characteristic analysis (FIG. 2A)/after electrochemical characteristic analysis (FIG. 2B) of a half cell of the catalyst for a fuel cell, which is manufactured according to Example.
Figure 2B:
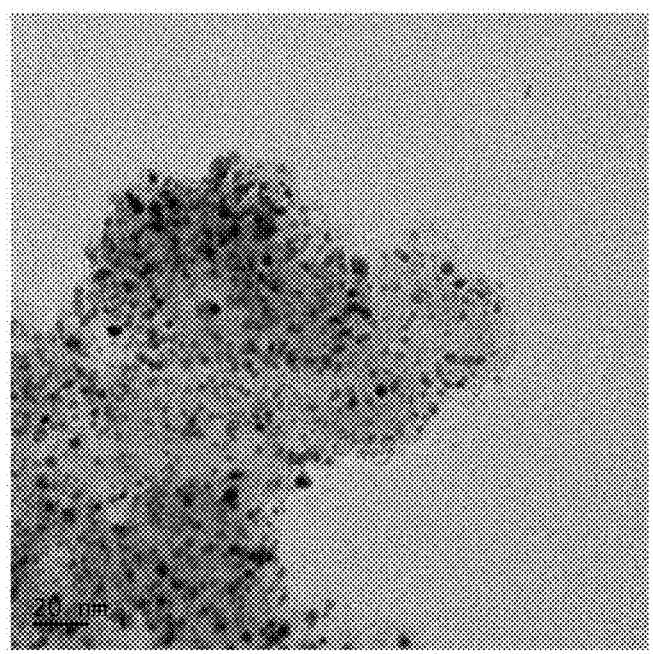
Figure 3A:
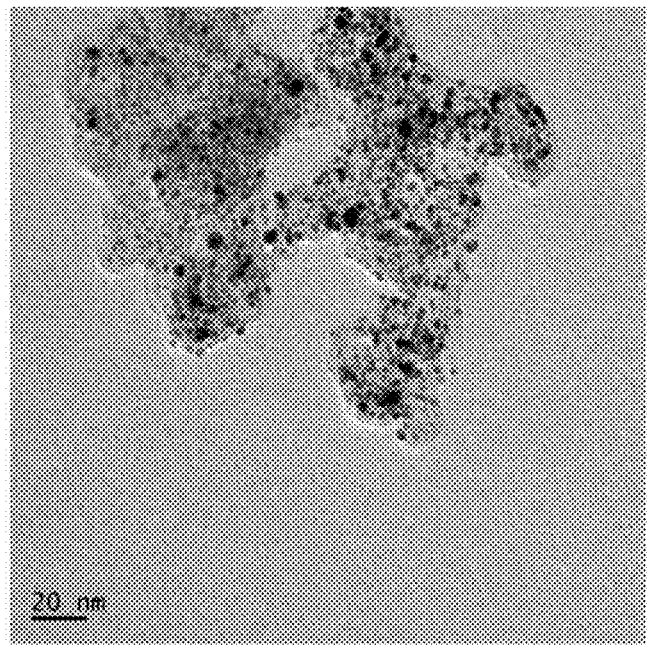
FIGS. 3A and 3B are TEM images showing a catalyst for a fuel cell before electrochemical characteristic analysis (FIG. 3A)/after electrochemical characteristic analysis (FIG. 3B) of a half cell of the catalyst for a fuel cell, which is manufactured according to Comparative Example 1.
Figure 3B:
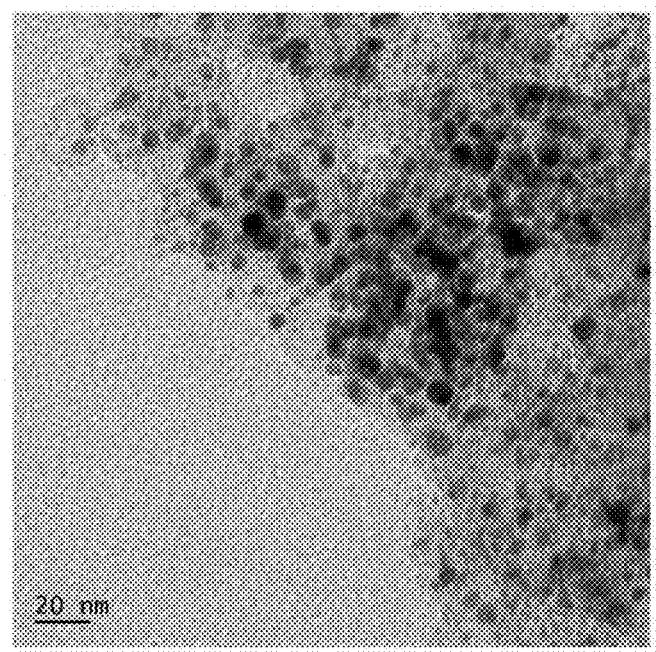

FIGS. 2A and 2B are transmission electron microscopy (TEM) images showing a catalyst for a fuel cell before electrochemical characteristic analysis (FIG. 2A)/after electrochemical characteristic analysis (FIG. 2B) of a half cell of the catalyst for a fuel cell, which is manufactured according to Example, and FIGS. 3A and 3B are TEM images showing a catalyst for a fuel cell before electrochemical characteristic analysis (FIG. 3A)/after electrochemical characteristic analysis (FIG. 3B) of a half cell of the catalyst for a fuel cell, which is manufactured according to Comparative Example 1.

As shown in FIGS. 2A and 2B, it was confirmed that, before the analysis, Pt nanoparticles, which were metal catalysts in the catalyst for a fuel cell of Example, were formed in sizes ranging from 2.5 nm to 3.5 nm, and even after the analysis (after 4,000 cycles), a degree of roughness was less in the range of 3.7 nm to 6 nm.

Meanwhile, referring to FIGS. 3A and 3B, it was confirmed that, before the analysis, Pt nanoparticles, which were metal catalysts in the catalyst for a fuel cell of Comparative Example 1, were formed in sizes ranging from 2.3 nm to 5 nm, and even after the analysis (after 4,000 cycles), a degree of roughness was increased in the range of 4 nm to 9 nm.

That is, since the carbon support for a fuel cell catalyst manufactured by the manufacturing method according to one embodiment of the present invention has excellent durability, there is an advantage in that the catalyst metal supported on the fuel cell manufactured by the manufacturing method may also perform a catalytic function for a long period of time without any special modification.

Experimental Example 2: Analysis of Ratio of Pyridinic N/Pyrrolic N and Durability According to Analysis of Electrochemical Characteristic of Half Cell In order to analyze a relationship between a ratio of the pyridinic N/the pyrrolic N and durability according to the analysis of the electrochemical characteristic of the half cell, the catalysts for a fuel cell were manufactured according to Example and Comparative Examples 1 to 5, and a ratio of each of the pyridinic N and the pyrrolic N was analyzed and shown in FIGS. 4A to 4C and Table 1 below.

TABLE 1

| | Composition | | | Result | | | | |
|---|---|---|---|---|---|---|---|---|
| | N Precursor | Carbon Pretreatment | Temperature of heat treatment (° C.) | N Amount of doping ($N_{EA}$ [at%]) | Ratio of pyndinic N (%) | Ratio of pyrrolic N (%) | pyridinic N/pyrrolic N Ratio (ratio) | Durability of half cell (Mass activity at 0.6 V) |
| Comparative Example 1 | X | X | X | 0% | 0% | 0% | — | Decrease of 62% |
| Example | Melamine | O | 800 | about 2.4% | 46.6% | 44.8% | 1.04 | Decrease of 30% |
| Comparative Example 2 | Melamine | X | 800 | about 1.3% | 48.9% | 36.7% | 1.33 | Decrease of 43% |
| Comparative Example 3 | Melamine | X | 700 | about 2.5% | 46.7% | 28.6% | 1.63 | Decrease of 52% |
| Comparative Example 4 | Melamine | X | 900 | about 0.6% | Not measurable | Not measurable | — | Decrease of 59% |
| Comparative | Melamine | O | 900 | about 1.8% | 21.6% | 49.7% | 0.43 | Decrease of 48% |

TABLE 1-continued

| | Composition | | | Result | | | | |
|---|---|---|---|---|---|---|---|---|
| N Precursor | Carbon Pretreatment | Temperature of heat treatment (° C.) | N Amount of doping ($N_{EA}$ [at%]) | Ratio of pyndinic N (%) | Ratio of pyrrolic N (%) | pyridinic N/pyrrolic N Ratio (ratio) | Durability of half cell (Mass activity at 0.6 V) |
| Example 5 | | | | | | | | |

Figure 4A:
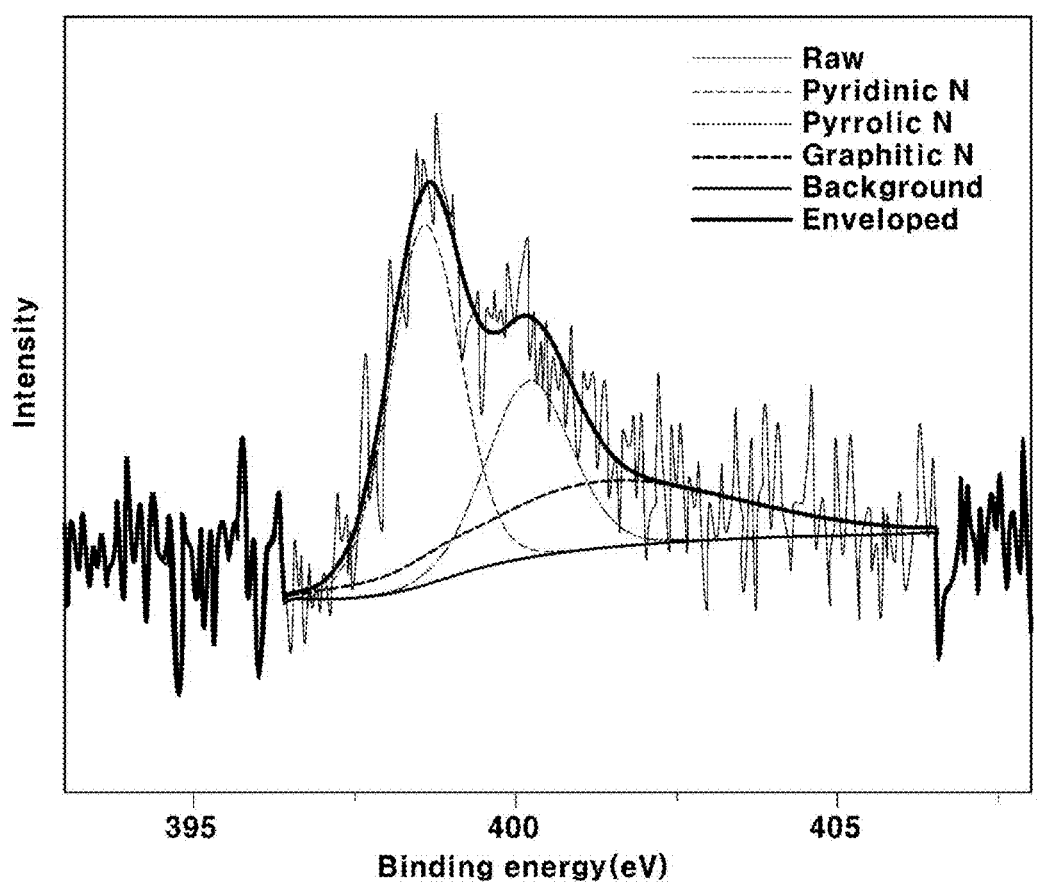
FIGS. 4A to 4C are graphs showing results of analyzing nitrogen of carbon supports for a fuel cell catalyst in catalysts for a fuel cell according to Example (FIG. 4A), Comparative Example 2 (FIG. 4B), and Comparative Example 3 (FIG. 4C)
Figure 4B:
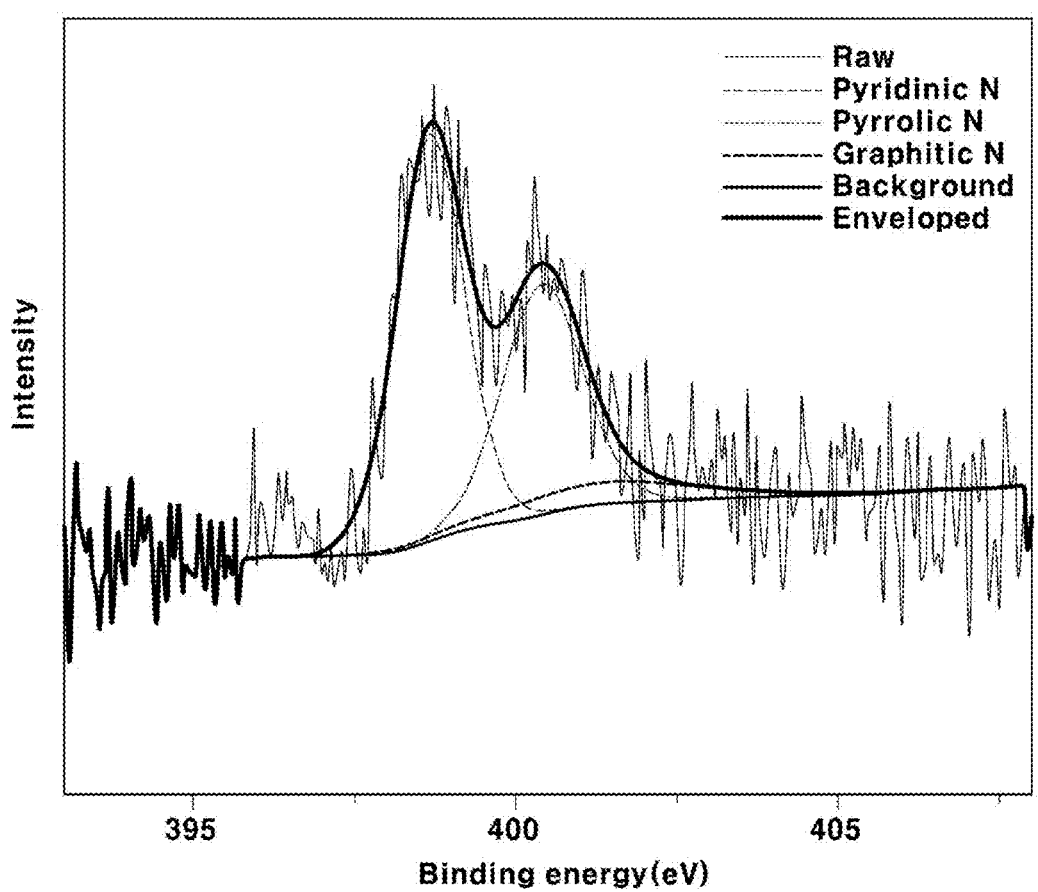
Figure 4C:
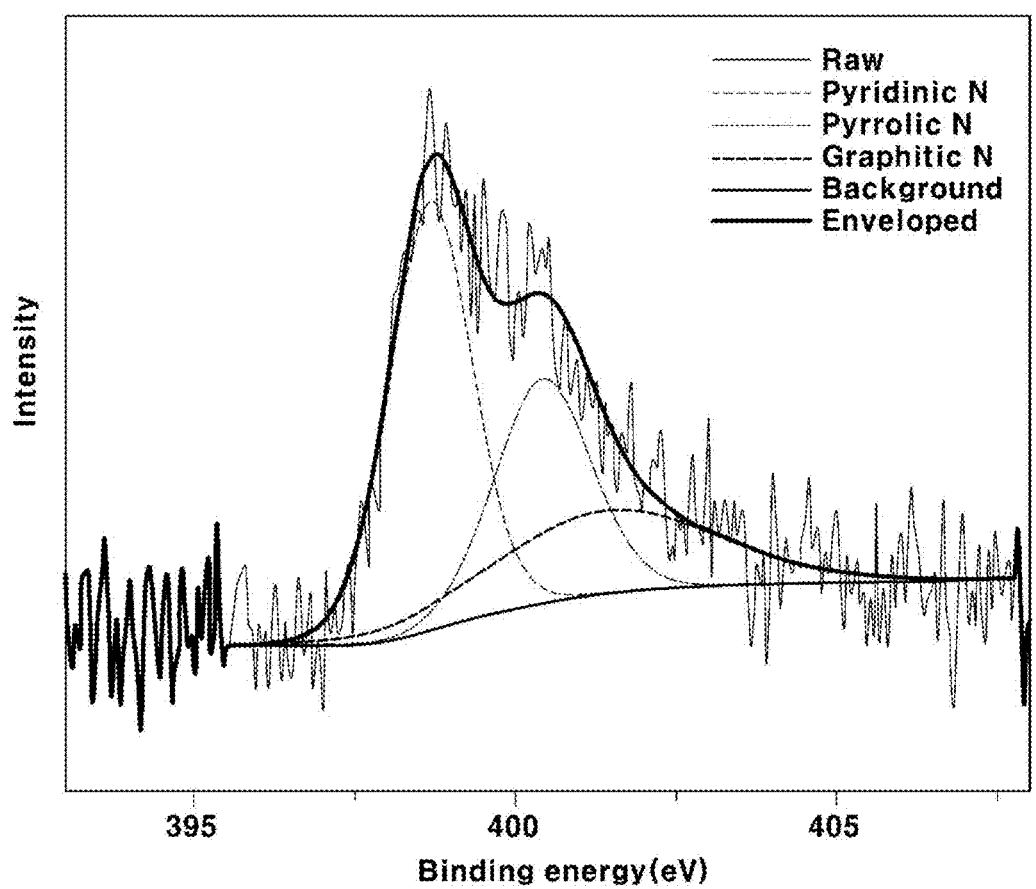

FIGS. 4A to 4C are graphs showing results of analyzing nitrogen of carbon supports for a fuel cell catalyst in catalysts for a fuel cell according to Example (FIG. 4A), Comparative Example 2 (FIG. 4B), and Comparative Example 3 (FIG. 4C). As shown in FIGS. 4A to 4C and Table 1, it was confirmed that, in Comparative Examples 1 and 4, the ratio of the pyridinic N/the pyrrolic N could not be measured. Thus, referring to Example and Comparative Examples 2, 3, and 5, it was confirmed that, since N doping is difficult when the temperature of the heat treatment process in the manufacturing process is too high, the temperature of the heat treatment should not be too high, and when the temperature of the heat treatment was raised, the ratio of the pyrrolic N was increased in the doped N. In addition, it was confirmed that a doping amount of the N was increased during the heat treatment after the pretreatment of carbon.

Figure 5B:
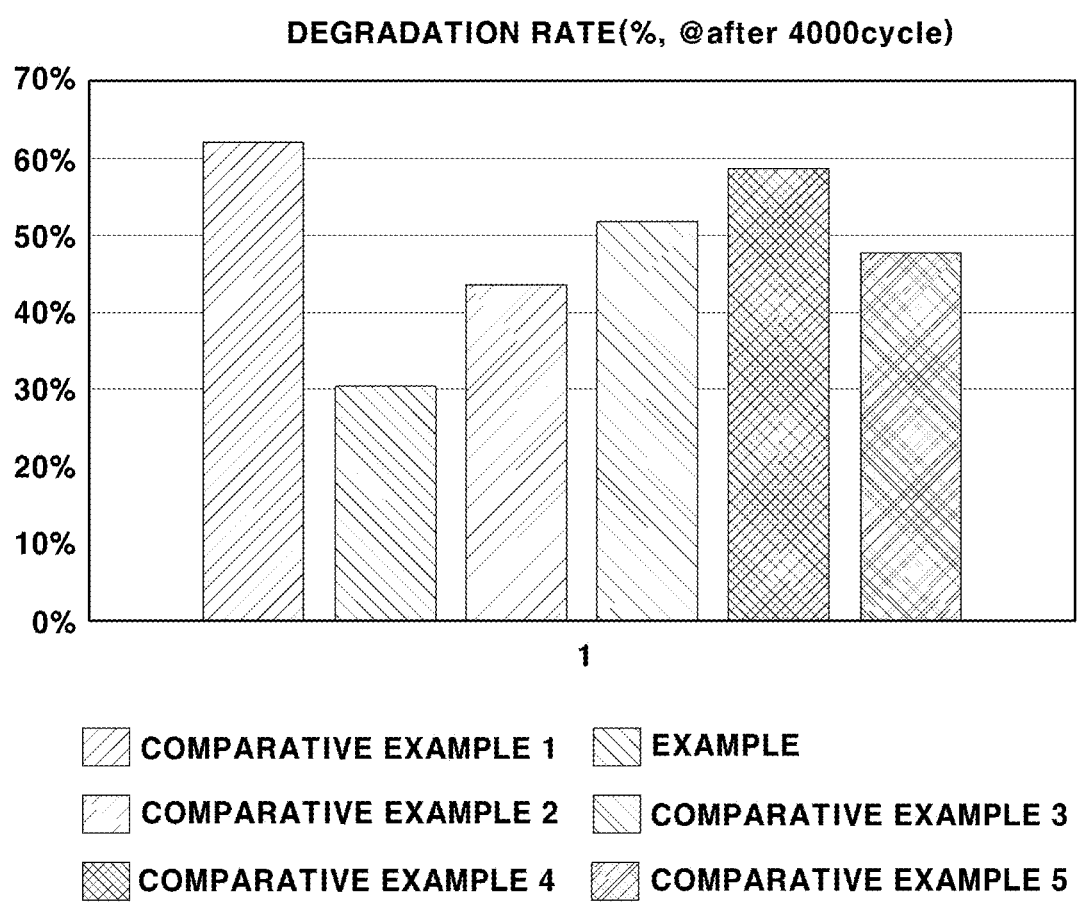

Next, on the basis of the tendency, a relationship with durability after the analysis of the electrochemical characteristic of the half cell according to the ratio of the pyridinic N/the pyrrolic N was analyzed, and the results were shown in FIGS. 5A and 5B and in Table 1 above.

FIGS. 5A and 5B are graphs comparing electrochemical characteristics before and after analysis of electrochemical characteristics of half cells of the catalysts for a fuel cell (FIG. 5A) and corresponding degradation rates (FIG. 5B) according to Example and Comparative Examples 1 to 5.

As shown in FIGS. 5A and 5B and Table 1, it was confirmed that the durability of the catalyst for a fuel cell doped with N according to Example was improved about 2.5 times as compared with the catalyst for a fuel cell not doped with N according to Comparative Example 1.

In addition, when a degradation rate was compared with the ratio of the pyridinic N/the pyrrolic N to the durability, it was confirmed that, as the ratio of the pyridinic N/the pyrrolic N was close to 1, a durability effect of the half cell was maximized. This means that structural distortion between the unshared electron pair of the pyridinic N and the pyrrolic N properly occurs at the above ratio so that an anchoring effect of the Pt metal, which is the catalyst metal, is maximized.

This can be clearly confirmed once more when the ratio of the pyridinic N/the pyrrolic N according to the fuel cell of Comparative Example 5 is compared with the degradation rate. Particularly, it was confirmed that, after the pretreatment process of carbon, when the temperature of the heat treatment was additionally raised, the content ratio of pyrrolic N was increased but an improvement effect of the durability was decreased. In other words, although only a ratio of the structural distortion between the unshared electron pair of the pyridinic N and the pyrrolic N is high, the anchoring effect of the catalyst metal is not simply increased, and an appropriate ratio of the structural distortion between the unshared electron pair of the pyridinic N and the pyrrolic N should be necessarily accompanied.

According to various exemplary embodiments of the present invention, since the carbon support and the organic material containing N are simply physically mixed, the dispersion problem of solubility, which may become a problem when each of the carbon support and the organic material containing N is dissolved in the distilled water or the organic solvent for mixing, may be solved and there is an advantage in that it is possible to use various organic materials containing N and various carbon supports, which are free from the above dispersion problem. Since the admixture is subjected to a heat treatment process only once, the process is simple, and thus there is an advantage of excellent economic feasibility, and the pyridinic N and the pyrrolic N of the doped N may be adjusted to close to an optimal content ratio of 1 through the manufacturing method so that the carbon support for a fuel cell catalyst manufactured according to the above manufacturing method and the catalyst for a fuel cell including the same have advantages of excellent electrochemical resistance and excellent electrochemical characteristic due to an increase in an electrochemically active surface area, and excellent durability due to an increase in thermal durability.

According to various exemplary embodiments of the present invention, since a conductive carbon support and an organic material containing nitrogen (N) are simply physically mixed, the dispersion problem of solubility, which may become a problem when each of the carbon support and the organic material containing N is dissolved in the distilled water or the organic solvent for mixing, can be solved and there is an advantage in that it is possible to use various organic materials containing N and various conductive carbon supports, which are free from the above dispersion problem, and since the admixture is subjected to a heat treatment process only once, the process can be simplified so that there is an advantage of excellent economic feasibility.

In addition, according to the various exemplary embodiments, pyridinic N and pyrrolic N of the doped N can be included at an optimal content ratio so that the carbon support for a fuel cell catalyst manufactured according to the manufacturing method and the catalyst for a fuel cell including the same have advantages of excellent electrochemical resistance and excellent electrochemical characteristic due to an increase in an electrochemically active surface area, and excellent durability due to an increase in thermal durability.

The effects of the present invention are not limited to the above-described effects. It should be understood that the effects of the present invention include all effects which can be inferred from the above description.

Although the present invention has been described in detail, the terms or words used in the specification and the appended claims should not be construed as being limited to ordinary or dictionary meanings, and the embodiments described herein and the configurations shown in the accompanying drawings are only exemplary embodiments of the present invention so that the scope of the present invention is not limited to these embodiments, and various modifications and improvements devised by those skilled in the art using the fundamental concept of the present invention, which is defined by the appended claims, further fall within the scope of the present invention.

What is claimed is:

1. A method of manufacturing of a carbon support for a fuel cell catalyst, comprising:
   pretreating a conductive carbon support with an acid solution;
   preparing an admixture comprising 1) the pretreated conductive carbon support and 2) an organic material containing nitrogen (N); and
   heat-treating the admixture,
      wherein the heat-treating is performed at a temperature ranging from 750° C. to 850° C.,
      wherein, in the pretreating, the pretreatment is performed at a temperature ranging from 130° C. to 150° C. for one to two hours,
      wherein an interior of the carbon support is doped with nitrogen (N), and the N is present in a form of pyridinic N, pyrrolic N and graphitic N,
      wherein amount of the pyridinic N or the pyrrolic N is greater than the graphitic N,
      and
      wherein a content ratio of the pyridinic N/the pyrrolic N ranges from 0.50 to 1.30.

2. The method of claim 1, wherein, in the pretreating, a weight ratio of the conductive carbon support to the acid solution is 1:40 to 50.

3. The method of claim 1, wherein the conductive carbon support comprises one or more selected from the group consisting of carbon black, acetylene black, carbon nanotubes, black lead, graphene, graphite nanofibers, fullerene, ketjen black, graphite, and ordered mesoporous carbon.

4. The method of claim 1, wherein an acid contained in the acid solution comprises one or more selected from the group consisting of nitric acid, hydrochloric acid, sulfuric acid, and perchloric acid.

5. The method of claim 1, wherein, in the preparing the admixture, a weight ratio of the pretreated conductive carbon support to the organic material containing N is 1:5 to 10.

6. The method of claim 1, wherein the organic material containing N comprises one or more selected from the group consisting of melamine, urea, ammonia ($NH_3$), and cyanide (CN).

7. The method of claim 1, further comprising:
   after the heat-treating of the admixture, washing and drying the heat-treated admixture.

8. The method of claim 7, wherein the washing is performed with a mixed solution of water and ethanol at a temperature ranging from 50° C. to 70° C.

9. The method of claim 7, wherein the drying is performed at a temperature ranging from 80° C. to 85° C. for ten to fourteen hours.

10. A method of manufacturing of a carbon support for a fuel cell catalyst, comprising:
    pretreating a conductive carbon support with an acid solution;
    preparing an admixture by physically mixing 1) the pretreated conductive carbon support and 2) a solid phase organic material containing nitrogen (N); and
    heat-treating the admixture,
       wherein, in the preparing the admixture, a weight ratio of the pretreated conductive carbon support to the organic material containing N is 1:5 to 10,
       wherein, in the pretreating, the pretreatment is performed at a temperature ranging from 130° C. to 150° C. for one to two hours,
       wherein an interior of the carbon support is doped with nitrogen (N), and the N is present in a form of pyridinic N, pyrrolic N and graphitic N,
       wherein amount of the pyridinic N or the pyrrolic N is greater than the graphitic N,
       and
       wherein a content ratio of the pyridinic N/the pyrrolic N ranges from 0.50 to 1.30.

* * * * *